United States Patent
Lin et al.

(10) Patent No.: US 11,601,066 B2
(45) Date of Patent: Mar. 7, 2023

(54) CONVERSION APPARATUS WITH THREE-LEVEL SWITCHING CIRCUIT AND METHOD OF OPERATING THE SAME

(71) Applicant: DELTA ELECTRONICS, INC., Taoyuan (TW)

(72) Inventors: Hung-Chieh Lin, Taoyuan (TW); Yi-Ping Hsieh, Taoyuan (TW); Jin-Zhong Huang, Taoyuan (TW); Hung-Yu Huang, Taoyuan (TW); Chih-Hsien Li, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/395,923

(22) Filed: Aug. 6, 2021

(65) Prior Publication Data

US 2022/0045627 A1 Feb. 10, 2022

(30) Foreign Application Priority Data

Aug. 7, 2020 (CN) .......................... 202010789347.4

(51) Int. Cl.
*H02M 7/538* (2007.01)
*H02M 7/5387* (2007.01)
(Continued)

(52) U.S. Cl.
CPC ........... *H02M 7/5387* (2013.01); *H02J 9/062* (2013.01); *H02M 1/0003* (2021.05);
(Continued)

(58) Field of Classification Search
CPC .. H02M 7/5387; H02M 1/0003; H02M 1/007; H02M 1/4233; H02M 3/33569;
(Continued)

(56) References Cited

U.S. PATENT DOCUMENTS

| 4,933,831 A * | 6/1990 | Takahashi ........... H02M 1/0085 363/124 |
| 5,017,800 A * | 5/1991 | Divan .................... H02M 5/458 307/66 |

(Continued)

FOREIGN PATENT DOCUMENTS

| TW | 201713020 A | 4/2017 |
| WO | WO2020108460 A1 | 6/2020 |

*Primary Examiner* — Yusef A Ahmed
(74) *Attorney, Agent, or Firm* — Muncy, Geissler, Olds & Lowe, P.C.

(57) ABSTRACT

A conversion apparatus with a three-level switching circuit includes a DC conversion module, a three-level circuit, and a control unit. The three-level circuit includes a bridge arm assembly and a capacitor assembly. The capacitor assembly includes a first capacitor and a second capacitor connected to the first capacitor in series. The DC conversion module has a positive output end and a negative output end, and the positive output end and the negative output end are coupled to the bridge arm assembly. The control unit controls the switching of a second switch unit and a third switch unit to make the three-level circuit operate in a first state where the positive output end and the negative output end are connected to the first capacitor, and operate in a second state where the positive output end and the negative output end are connected to the second capacitor.

15 Claims, 10 Drawing Sheets

(51) Int. Cl.
- *H02M 1/00* (2006.01)
- *H02J 9/06* (2006.01)
- *H02M 1/42* (2007.01)
- *H02M 3/335* (2006.01)
- *H02M 7/487* (2007.01)

(52) U.S. Cl.
CPC ......... *H02M 1/007* (2021.05); *H02M 1/4225* (2013.01); *H02M 1/4233* (2013.01); *H02M 3/33569* (2013.01); *H02M 3/33573* (2021.05); *H02M 3/33576* (2013.01); *H02M 7/487* (2013.01)

(58) Field of Classification Search
CPC ......... H02M 3/33573; H02M 3/33576; H02M 7/487; H02M 7/537; H02J 9/062
See application file for complete search history.

(56) References Cited

U.S. PATENT DOCUMENTS

| | | | |
|---|---|---|---|
| 5,063,490 A * | 11/1991 | Maehara | H05B 41/392 363/124 |
| 7,292,462 B2 | 11/2007 | Watanabe et al. | |
| 9,154,000 B2 * | 10/2015 | Sato | H02J 9/062 |
| 10,263,457 B2 * | 4/2019 | Nishimura | H02J 9/06 |
| 10,516,365 B1 * | 12/2019 | Serban | H02M 7/487 |
| 10,674,640 B1 | 6/2020 | Kao | H02M 7/003 |
| 10,910,943 B1 * | 2/2021 | Lin | H02M 7/797 |
| 2008/0197706 A1 * | 8/2008 | Nielsen | H02M 7/487 363/67 |
| 2010/0054002 A1 * | 3/2010 | Lu | H02J 9/062 363/37 |
| 2011/0012543 A1 * | 1/2011 | Takizawa | B60L 58/18 318/139 |
| 2011/0049991 A1 * | 3/2011 | Sato | H02M 1/44 307/48 |
| 2011/0127837 A1 * | 6/2011 | Sato | H02J 9/062 307/66 |
| 2011/0134672 A1 * | 6/2011 | Sato | H02M 1/10 363/126 |
| 2011/0170322 A1 * | 7/2011 | Sato | H02M 7/487 363/40 |
| 2012/0044728 A1 * | 2/2012 | Yatsu | H02M 7/219 363/126 |
| 2013/0049699 A1 * | 2/2013 | Jayaraman | H02M 1/10 320/137 |
| 2013/0119525 A1 * | 5/2013 | Tsuyuno | H01L 24/37 438/122 |
| 2014/0001838 A1 * | 1/2014 | Watanabe | B60L 50/40 307/9.1 |
| 2015/0162822 A1 * | 6/2015 | Ho | H02M 1/4208 363/89 |
| 2017/0012550 A1 * | 1/2017 | Abe | H02M 5/4585 |
| 2017/0085170 A1 * | 3/2017 | Li | H02J 3/38 |
| 2017/0294833 A1 * | 10/2017 | Yang | H02M 7/23 |
| 2018/0076656 A1 * | 3/2018 | Nishimura | H02J 3/38 |
| 2018/0076657 A1 * | 3/2018 | Nishimura | H02J 3/38 |
| 2019/0199126 A1 * | 6/2019 | Cheng | H02J 9/062 |
| 2020/0006980 A1 * | 1/2020 | Tolakanahalli | H02M 1/4208 |
| 2020/0021182 A1 * | 1/2020 | Kao | H02M 1/32 |
| 2020/0028440 A1 * | 1/2020 | Kadam | H02M 7/4835 |
| 2020/0177100 A1 * | 6/2020 | Wang | H02M 7/4837 |
| 2020/0220466 A1 * | 7/2020 | Backman | H02M 3/33576 |
| 2020/0321878 A1 * | 10/2020 | Zhang | H02M 1/08 |
| 2021/0036632 A1 * | 2/2021 | Hayashi | H02M 3/158 |
| 2021/0050773 A1 * | 2/2021 | Lin | H02M 1/4266 |
| 2021/0175742 A1 * | 6/2021 | Hayashi | H02J 9/063 |
| 2021/0367453 A1 * | 11/2021 | Galigekere | H02M 3/01 |

\* cited by examiner

//<br>
CONVERSION APPARATUS WITH THREE-LEVEL SWITCHING CIRCUIT AND METHOD OF OPERATING THE SAME

BACKGROUND

Technical Field

The present disclosure relates to a conversion apparatus with a three-level switching circuit and a method of operating the same, and more particularly to a conversion apparatus with a three-level switching circuit and a method of operating the same capable of increasing overall power density.

Description of Related Art

The statements in this section merely provide background information related to the present disclosure and do not necessarily constitute prior art.

Uninterruptible power system (UPS) is a device that can continuously provide backup power for electrical load equipment in the case of abnormal power grid so as to maintain the normal operation of electrical appliances. Under general circumstances, the uninterrupted power system is used to maintain the uninterrupted operation for key commercial equipment or precision instruments, such as computers (especially servers) or switches, especially in the current situation where server applications are more and more extensive, the efficiency of uninterruptible power systems is getting more and more attention.

Please refer to FIG. 1, which shows a block diagram of a conventional uninterruptible power system (UPS). The circuit structure of the UPS mainly uses a DC conversion module 10 with dual bus voltages. In general, the DC conversion module 10 can stabilize the dual buses, and therefore the DC conversion module 10 needs to generate a voltage of 800 volts to maintain a voltage on a first capacitor 242 and a second capacitor 244 at 800 volts. Usually, a rear-end circuit of the first capacitor 242 and the second capacitor 244 is a three-level or multi-level inverter module 30. Since the common-neutral wire design needs to have a midpoint end O, the first capacitor 242 and the second capacitor 244 must form a three-end structure. After an input voltage Vin is converted to a voltage of 800 volts by the DC conversion module 10, the rear-end inverter module 30 (or a DC converter) provides energy to a load 300. Since the traditional DC conversion module 10 needs to provide a voltage of 800 volts across the dual buses, it causes disadvantages such as bulky circuit components due to increasing the component withstand voltage.

SUMMARY

In order to solve the above-mentioned problems, a conversion apparatus with a three-level switching circuit is provided. The conversion apparatus includes a DC conversion module, a three-level circuit, and a control unit. The DC conversion module has a DC input end and an output end, the DC input end receives an input voltage, and the output end has a positive output end and a negative output end. The three-level circuit includes a bridge arm assembly and a capacitor assembly. The bridge arm assembly has a first switch unit, a second switch unit, a third switch unit, and a fourth switch unit connected in series. A first node between the first switch unit and the second switch unit is coupled to the positive output end, and a second node between the third switch unit and the fourth switch unit is coupled to the negative output end. The capacitor assembly has a first capacitor and a second capacitor connected in series. A positive end of the first capacitor is coupled to the first switch unit and a negative end of the second capacitor is coupled to the fourth switch unit, and a middle end between the first capacitor and the second capacitor is coupled to a third node between the second switch unit and the third switch unit. The control unit controls the bridge arm assembly to operate in a DC mode. In the DC mode, the control unit switches the second switch unit and the third switch unit so that the three-level circuit operates in a first state of connecting the first capacitor to the positive output end and the negative output end, and operates in a second state of connecting the second capacitor to the positive output end and the negative output end.

In order to solve the above-mentioned problems, a method of operating a three-level switching circuit is provided. The three-level switching circuit includes a bridge arm assembly having a first switch unit, a second switch unit, a third switch unit, and a fourth switch unit connected in series. A first node between the first switch unit and the second switch unit is coupled to a positive output end of a DC conversion module, and a second node between the third switch unit and the fourth switch unit is coupled to a negative output end of the DC conversion module. The method includes steps of: controlling the bridge arm assembly operating in a DC mode, turning on the third switch unit in a first cycle of the DC mode so that the DC conversion module charges a first capacitor through the positive output end and the negative output end to maintain a first capacitor voltage across the first capacitor to be a bus voltage, and turning on the second switch unit in a second cycle following the first cycle so that the DC conversion module charges a second capacitor connected to the first capacitor in series through the positive output end and the negative output end to maintain a second capacitor voltage across the second capacitor to be the bus voltage.

The main purpose and effect of the present disclosure is that the control unit can independently switch and control the first capacitor and the second capacitor, and therefore in the dual bus voltage circuit, the DC conversion module only needs to control the first capacitor and the second capacitor separately. The cross voltage is a bus voltage, and there is no need to control twice the bus voltage at the same time, so the voltage stress of the components used in the DC conversion module can be halved, and the overall power density is high and the efficiency is good.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The present disclosure can be more fully understood by reading the following detailed description of the embodiment, with reference made to the accompanying drawing as follows.

DETAILED DESCRIPTION

Figure 1:
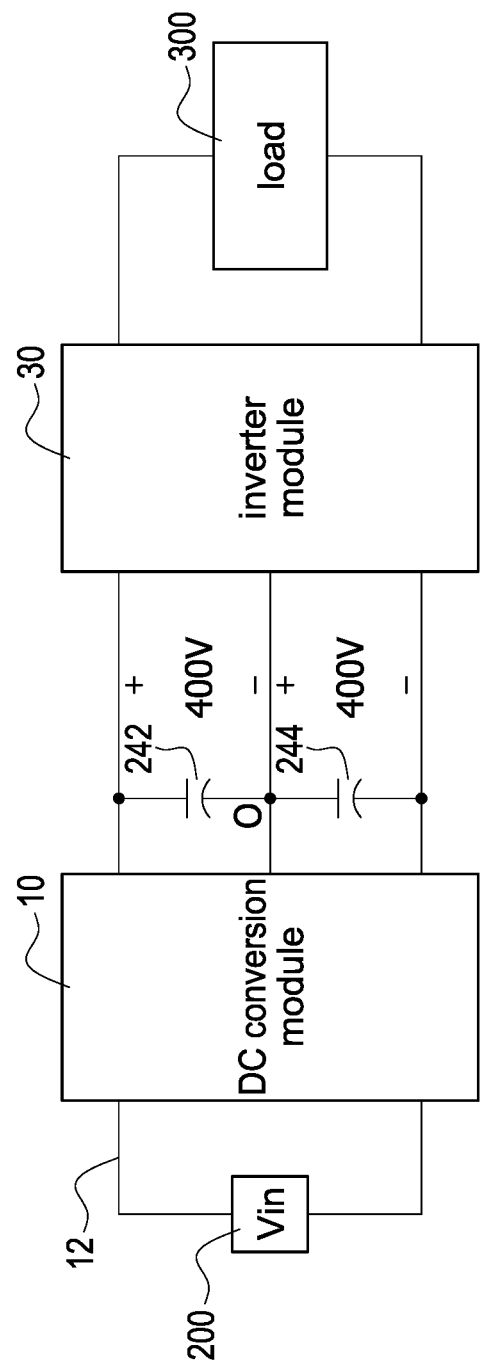
FIG. 1 is a block diagram of a conventional uninterruptible power system (UPS).

Reference will now be made to the drawing figures to describe the present disclosure in detail. It will be understood that the drawing figures and exemplified embodiments of present disclosure are not limited to the details thereof.

Figure 2:
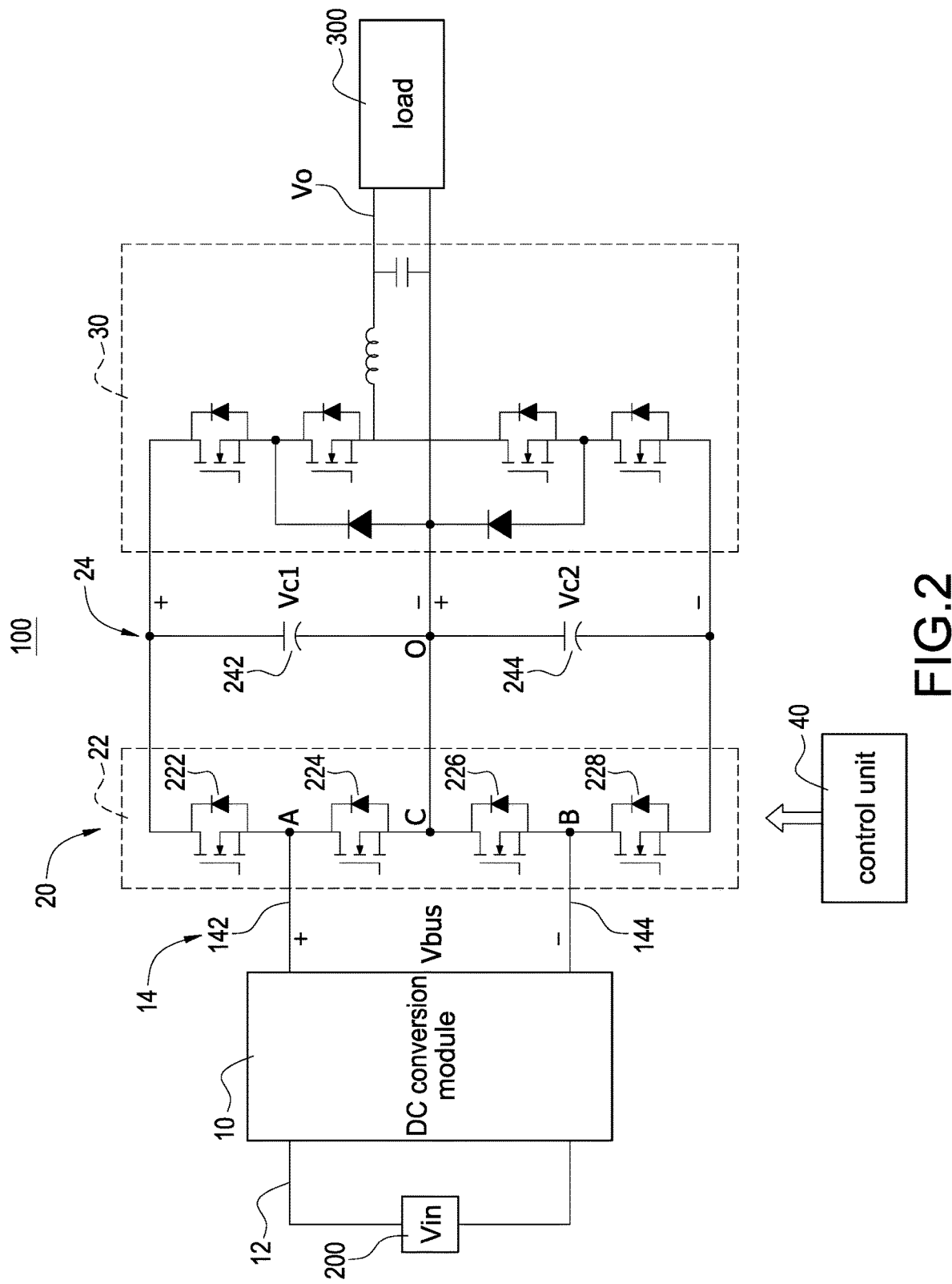
FIG. 2 is a block circuit diagram of a conversion apparatus with a three-level switching circuit according to a first embodiment of the present disclosure.

Please refer to FIG. 2, which shows a block circuit diagram of a conversion apparatus with a three-level switching circuit according to a first embodiment of the present disclosure. The conversion apparatus 100 receives an input voltage Vin provided from an external apparatus 200, for example but not limited to a battery or a renewable energy, and the conversion apparatus 100 converts the input voltage Vin into an output voltage Vo to supply power to a load 300. The conversion apparatus includes a DC conversion module 10, a three-level circuit 20, an inverting module 30, and a control unit 40. The three-level circuit 20 is coupled to the DC conversion module 10 and the inverting module 30. The DC conversion module 10 includes a DC input end 12 and an output end 14, and the output end 14 has a positive output end 142 and a negative output end 144. The DC input end 12 receives the input voltage Vin. A voltage between the positive output end 142 and the negative output end 144 is a bus voltage Vbus. The DC conversion module 10 is coupled to an input side of the three-level circuit 20 through the positive output end 142 and the negative output end 144.

The three-level circuit 20 includes a bridge arm assembly 22 and a capacitor assembly 24. The bridge arm assembly 22 includes a first switch unit 222, a second switch unit 224, a third switch unit 226, and a fourth switch unit 228 connected in series, and the capacitor assembly 24 includes a first capacitor 242 and a second capacitor 244 connected in series. A first node A between the first switch unit 222 and the second switch unit 224 is coupled to the positive output end 142, and a second node B between the third switch unit 226 and the fourth switch unit 228 is coupled to the negative output end 144 so that the three-level circuit 20 receives the output of the DC conversion module 10 through the first node A and the second node B. A positive end of the first capacitor 242 is coupled to one end of the first switch unit 222, a negative end of the first capacitor 242 is coupled to one end of the fourth switch unit 228, and a middle end O between the first capacitor 242 and the second capacitor 244 is coupled to a third node C between the second switch unit 224 and the third switch unit 226. The control unit 40 switches the bridge arm assembly 22 to connect the positive output end 142 and the negative output end 144 to the capacitor assembly 24, and therefore to charge the first capacitor 242 or the second capacitor 244. A voltage across two ends of the first capacitor 242 is defined as a first capacitor voltage Vc1, and a voltage across two ends of the second capacitor 244 is defined as a second capacitor voltage Vc2. Under an operation of a first state, that is, the positive output end 142 and the negative output end 144 are connected to the first capacitor 242, the first capacitor 242 can be regarded as an output capacitor of the DC conversion module 10, and the DC conversion module 10 controls the first capacitor voltage Vc1 to be the bus voltage Vbus. Under an operation of a second state, that is, the positive output end 142 and the negative output end 144 are connected to the second capacitor 244, the second capacitor 244 can be regarded as an output capacitor of the DC conversion module 10, and the DC conversion module 10 controls the second capacitor voltage Vc2 to be the bus voltage Vbus. In other words, by switching the bridge arm assembly 22, the output of the DC conversion module 10 is only the bus voltage Vbus, but it can double the bus voltage Vbus in the capacitor assembly 24.

The inverting module 30 is a three-level inverter. The input ends of the inverting module 30 receive the first capacitor voltage Vc1 and the second capacitor voltage Vc2. The control unit 40 controls the inverting module 30 to convert the first capacitor voltage Vc1 and the second capacitor voltage Vc2 into an AC output voltage Vo for supplying power to the load 300, and the middle end O is connected to a neutral wire of the output voltage Vo. In some high-voltage DC applications, when the output voltage Vo required by the load 300 is a DC voltage rather than an AC voltage, the inverting module 30 can be replaced by a DC converter (not shown). The control unit 40 controls the DC converter (not shown) to convert the first capacitor voltage Vc1 and the second capacitor voltage Vc2 into a DC output voltage Vo for supplying power to the DC load 300. In one embodiment, the inverting module 30 is not limited to be implemented only in the circuit structure of FIG. 2. For example, all inverters with a three-level circuit structure and DC-to-AC conversion function should be embraced within the scope of the present disclosure.

Since the conversion apparatus 100 includes the DC conversion module 10, the operation mode of the control unit 40 at least includes a DC mode. The DC conversion module 10, the three-level circuit 20, and the inverting module 30 can be controlled by a single controller, i.e., the control unit 40. Alternatively, the DC conversion module 10, the three-level circuit 20, and the inverting module 30 have their own controllers. For convenience, each of the controllers can be represented here by the control unit 40, that is, the control unit 40 is not a single controller. In the DC mode, the DC conversion module 10 converts the input voltage Vin into the bus voltage Vbus, and the control unit 40 switches the bridge arm assembly 22 so that the first capacitor 242 or the second capacitor 244 is charged by an output at the positive output end 142 and the negative output end 144 of the DC conversion module 10, thereby maintaining the first capacitor voltage Vc1 across the first capacitor 242 and the second capacitor voltage Vc2 across the second capacitor 244.

Figure 3A:
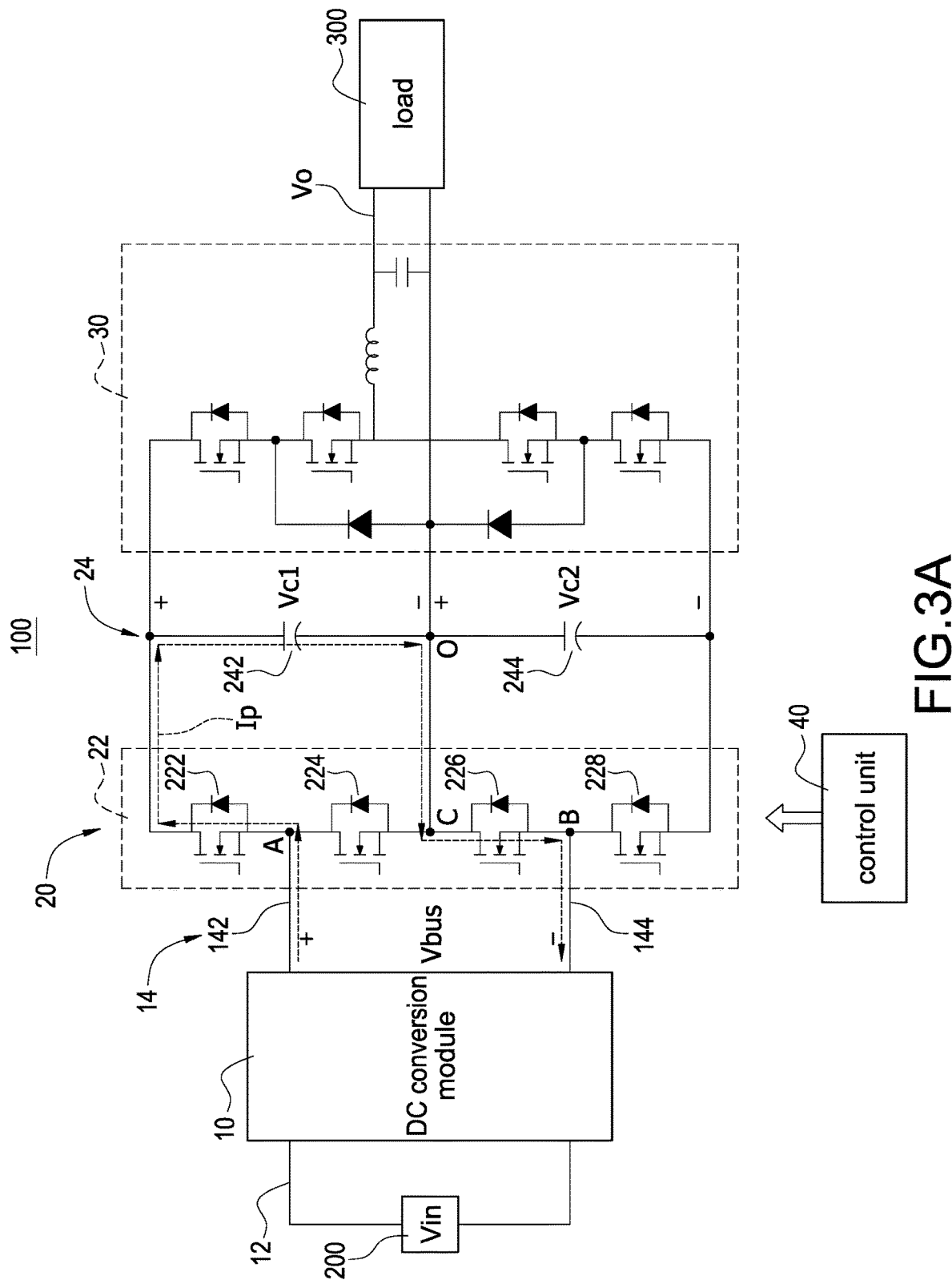
FIG. 3A is a block circuit diagram of charging a first capacitor by a DC conversion module according to the present disclosure.
Figure 3B:
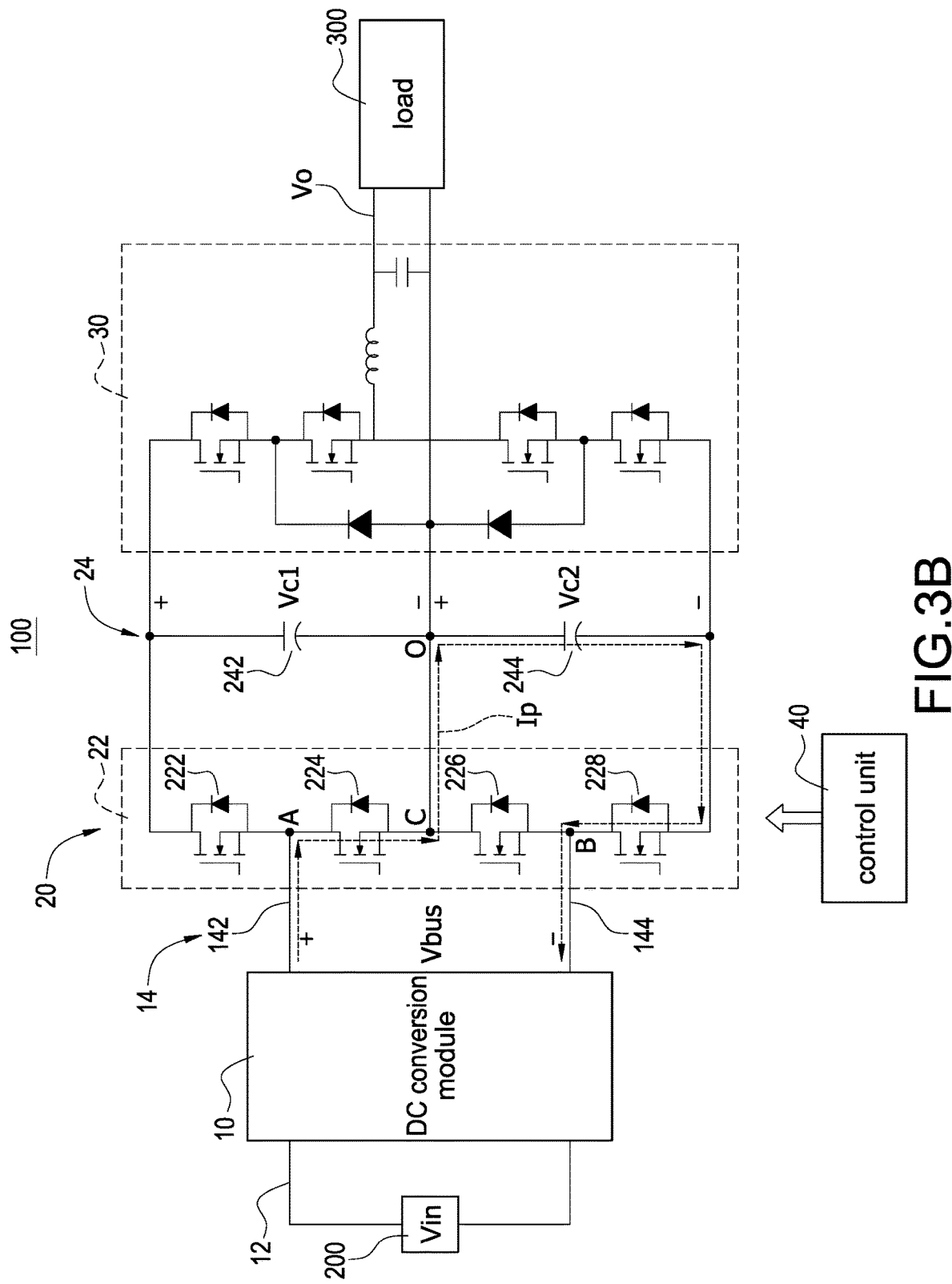
FIG. 3B is a block circuit diagram of charging a second capacitor by the DC conversion module according to the present disclosure.

Please refer to FIG. 3A and FIG. 3B, which show block circuit diagrams of charging a first capacitor and a second capacitor by a DC conversion module according to the present disclosure, respectively, and also refer to FIG. 2. The positive output end 142 is coupled to the first node A and the negative output end 144 is coupled to the second node B. In FIG. 3A, the control unit 40 turns on the first switch unit 222 and the third switch unit 226, and turns off the second switch unit 224 and the fourth switch unit 228. At this condition, the DC conversion module 10 charges the first capacitor 242 and maintains that the voltage value of the first capacitor voltage Vc1 is substantially equal to the voltage value of the bus voltage Vbus. Also, a current path Ip represented by dashed lines is formed through the positive output end 142, the first switch unit 222, the first capacitor 242, the third switch unit 226, and the negative output end 144.

In FIG. 3B, the control unit 40 turns off the first switch unit 222 and the third switch unit 226, and turns on the second switch unit 224 and the fourth switch unit 228. At this condition, the DC conversion module 10 charges the second capacitor 244 and maintains that the voltage value of the second capacitor voltage Vc2 is substantially equal to the voltage value of the bus voltage Vbus. Also, a current path Ip represented by dashed lines is formed through the positive output end 142, the second switch unit 224, the second capacitor 244, the fourth switch unit 228, and the negative output end 144. The main purpose and effect of the present disclosure are that the control unit 40 can independently switch and control the first capacitor 242 and the second capacitor 244. Therefore, the DC conversion module 10 only needs to have the ability to stabilize the bus voltage Vbus (for example but not limited to 400 volts) so that the voltage across the first capacitor 242 and the voltage across the second capacitor 244 are substantially equal to the bus voltage Vbus, that is, the first capacitor voltage Vc1 and the second capacitor voltage Vc2 are substantially equal to 400 volts. The DC conversion module 10 does not need to have the ability of stabilizing twice the bus voltage Vbus so that the voltage stress of the components used in the DC conversion module 10 is halved, the overall power density can be higher, and the efficiency is better.

Moreover, since the inverting module 30 is a three-level inverter, and the output voltage Vo in the positive half cycle is provided by the first capacitor voltage Vc1 and the output voltage Vo in the negative half cycle is provided by the second capacitor voltage Vc2, the first capacitor 242 has to provide energy when the output voltage Vo in the positive half cycle and the second capacitor 244 has to provide energy when the output voltage Vo in the negative half cycle. Therefore, when the bridge arm assembly 22 operates in the DC mode, the control unit 40 can control the switching frequency of the first switch unit 222, the second switch unit 224, the third switch unit 226, and the fourth switch unit 228 to the mains frequency (i.e., a low-frequency switching, for example but not limited to, 60 Hz in some countries). When the output voltage Vo is in the positive half cycle, the DC conversion module 10 provides energy to the first capacitor 242 to supplement the consumption of the first capacitor voltage Vc1. When the output voltage Vo is in the negative half cycle, the DC conversion module 10 provides energy to the second capacitor 244 to supplement the consumption of the second capacitor voltage Vc2. In one embodiment, when the bridge arm assembly 22 is operated in the DC mode, the switching frequency of the first switch unit 222, the second switch unit 224, the third switch unit 226, and the fourth switch unit 228 is not limited to the mains frequency. Since the energy stored in a capacitor is related to the capacitance of the capacitor, the switching frequency of these switch units can be selected to a first frequency with lower frequency according to the capacitances of the first capacitor 242 and the second capacitor 244. For example, when the capacitance is selected larger, the first frequency can be lower (for example but not limited to 1 kHz).

Figure 4A:
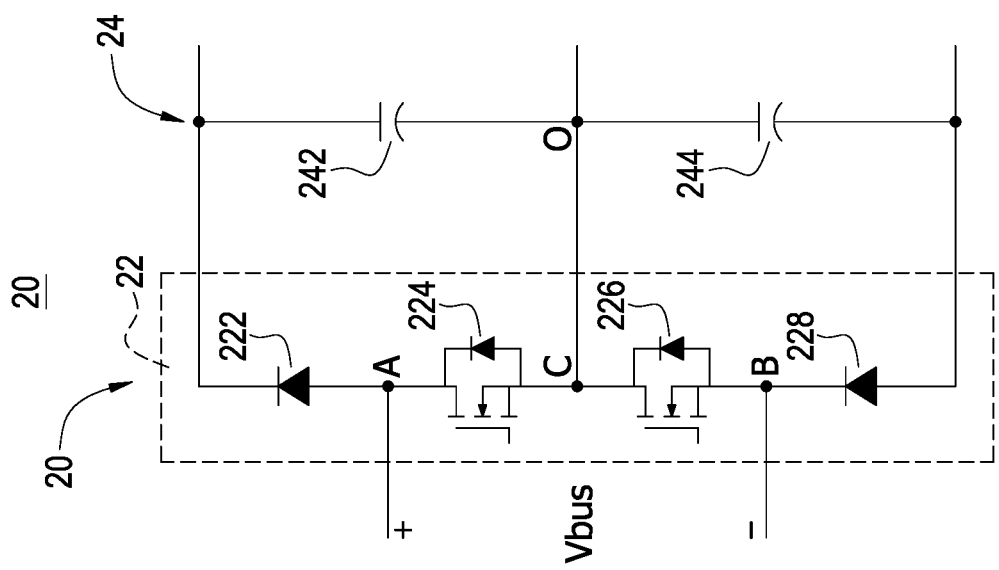
FIG. 4A is a circuit diagram of a three-level circuit according to a first embodiment of the present disclosure.
Figure 4B:
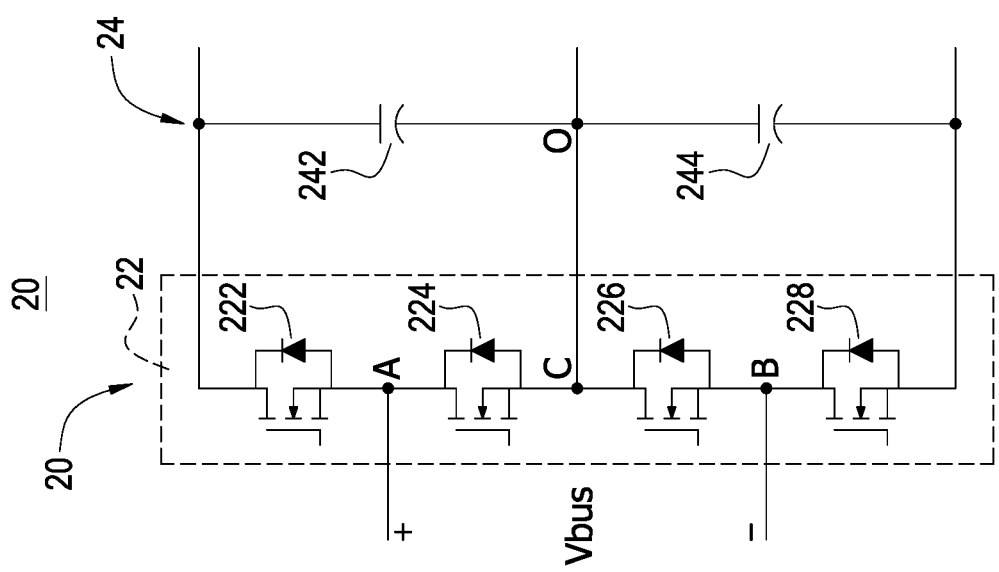
FIG. 4B is a circuit diagram of the three-level circuit according to a second embodiment of the present disclosure.

Please refer to FIG. 4A and FIG. 4B, which show circuit diagrams of a three-level circuit according to a first embodiment and a second embodiment of the present disclosure, respectively, and also refer to FIG. 2 to FIG. 3B. In FIG. 4A, the first switch unit 222 and the fourth switch unit 228 may be diodes. When the bridge arm assembly 22 operates in the DC mode and the control unit 40 turns on the third switch unit 226, the current path Ip shown in FIG. 3A can be also generated (formed) since the first switch unit 222 (a diode) is forward-biased turned on. At this condition, the fourth switch unit 228 (a diode) is reverse-biased turned off. When the control unit 40 turns on the second switch unit 224, the current path shown in FIG. 3B can be also generated (formed) since the fourth switch unit 228 (a diode) is forward-biased turned on. At this condition, the first switch unit 222 (a diode) is reverse-biased turned off.

In FIG. 4B, the first switch unit 222 and the fourth switch unit 228 may be transistors. The control unit 40 is coupled to the first switch unit 222 and the fourth switch unit 228, and provides control signals to turn on or turn off the first switch unit 222 and the fourth switch unit 228. When the bridge arm assembly 22 operates in the DC mode and the control unit 40 turns on the third switch unit 226, the control unit 40 also turns on the first switch unit 222 so that the current path Ip shown in FIG. 3A can be also generated (formed). At this condition, the control unit 40 also turns off the second switch unit 224 and the fourth switch unit 228. When the control unit 40 turns on the second switch unit 224, the control unit 40 also turns on the fourth switch unit 228 so that the current path Ip shown in FIG. 3B can be also generated (formed). At this condition, the control unit 40 also turns off the first switch unit 222 and the third switch unit 226. By switching the bridge arm assembly 22, the positive output end 142 and the negative output end 144 are connected to the first capacitor 242 for an operation of a first state, and the positive output end 142 and the negative output end 144 are connected to the second capacitor 244 for an operation of a second state. In particular, the "connection" of the first capacitor 242 or the second capacitor 244 is not determined by electrical isolation or not. As shown in FIG. 4A, when the first switch unit 222 and the fourth switch unit 228 of FIG. 4A are diodes, although electrical isolation or physical isolation cannot be achieved, the effect of connection or disconnection can be achieved according to the forward bias or the reverse bias.

Figure 5A:
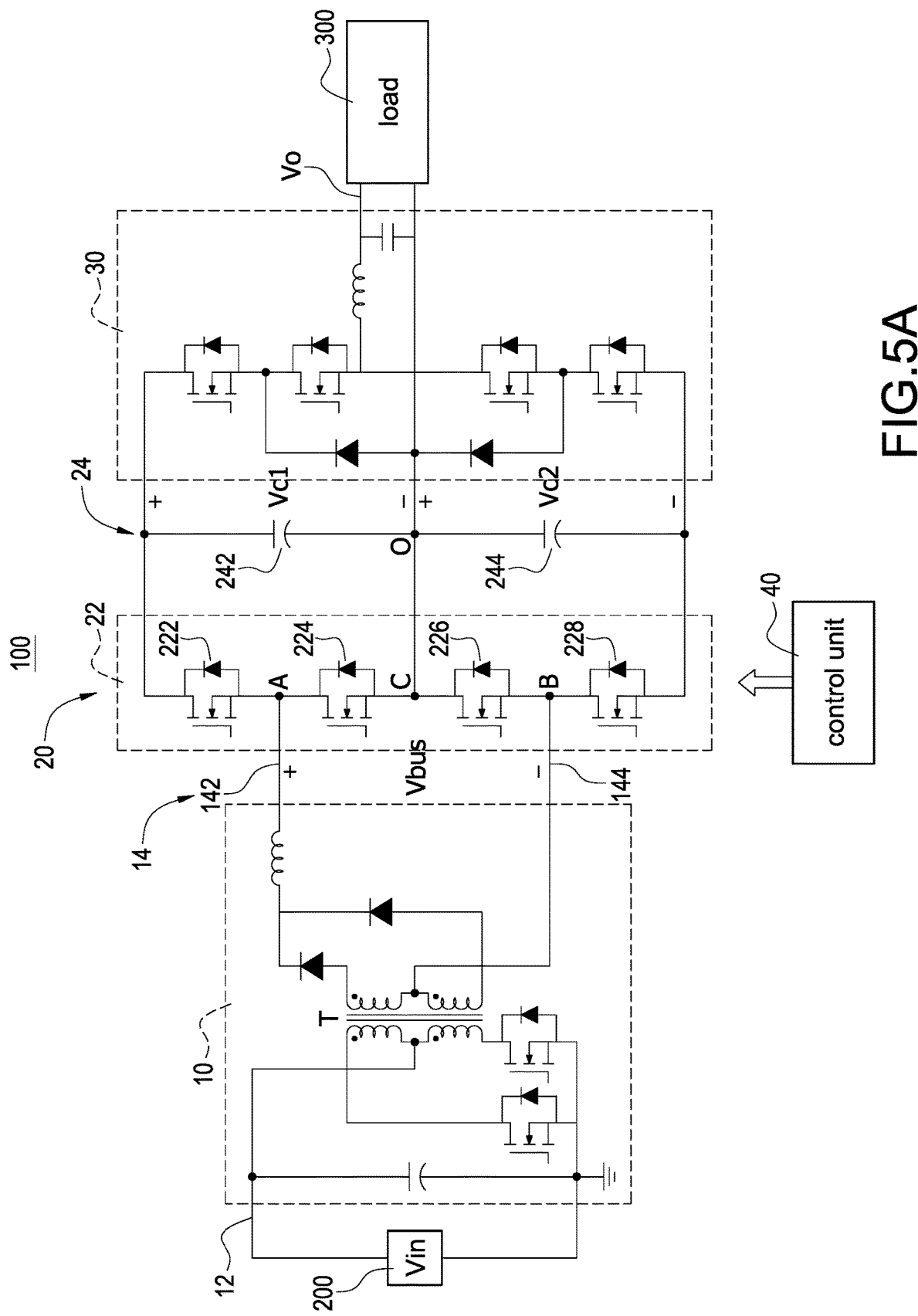
FIG. 5A is a block circuit diagram of the DC conversion module according to a first embodiment of the present disclosure.
Figure 5B:
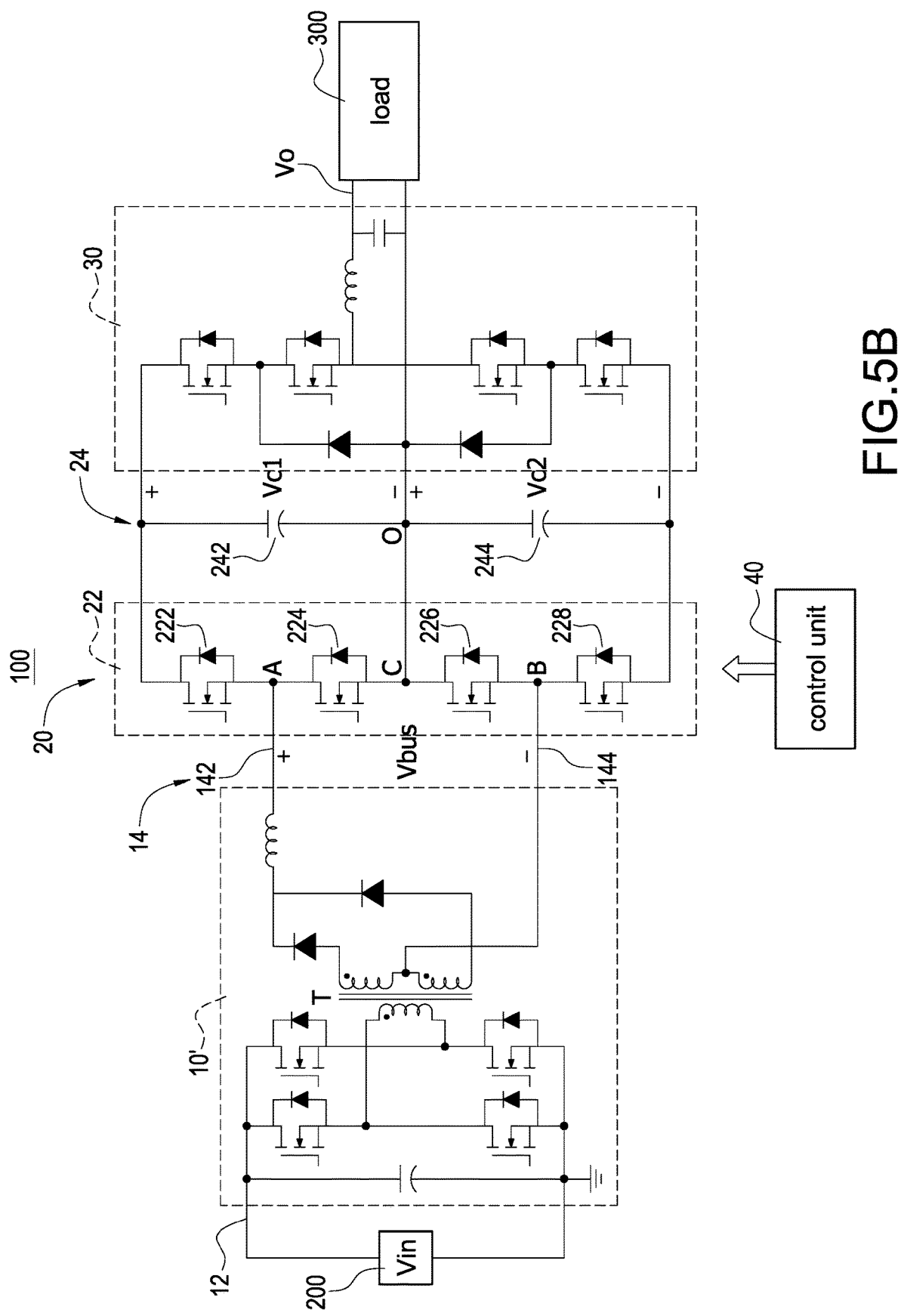
FIG. 5B is a block circuit diagram of the DC conversion module according to a second embodiment of the present disclosure.

Please refer to FIG. 5A and FIG. 5B, which show block circuit diagrams of the DC conversion module according to a first embodiment and a second embodiment of the present disclosure, and also refer to FIG. 2 to FIG. 3B. In FIG. 5A, the DC conversion module 10 is a push-pull converter with a transformer T, and no output regulated capacitor required. Because of switching the bridge arm assembly 22, a complete push-pull converter can be formed by connecting the output of the DC conversion module 10 to the first capacitor 242 or to the second capacitor 244. However, it is not limited to this, that is, a voltage regulation capacitor can be also additionally used.

In FIG. 5B, the DC conversion module 10' is a full-bridge phase-shift converter with a transformer T, and no output regulated capacitor required. In one embodiment, the DC conversion module 10 is not limited to only being implemented with the circuit structures of FIG. 5A and FIG. 5B, nor whether it has a transformer. For example, all converters with DC-to-DC conversion function should be embraced within the scope of the present disclosure. Preferably, the DC conversion module 10 is a switched-mode power supply, and includes at least one switching switch, and uses duty cycle, switching frequency, or phase of the switching switch to implement the output voltage control. In particular, when the DC conversion module 10 operates in the DC mode, the switching frequency of the at least one switching switch is high-frequency switching relative to the switching frequency of the bridge arm assembly 22. For example, the switching frequency is fixed at 50 kHz. or operates under variable frequency from 50 kHz to 100 kHz, which are higher than the mains frequency of the bridge arm assembly 22.

Figure 6:
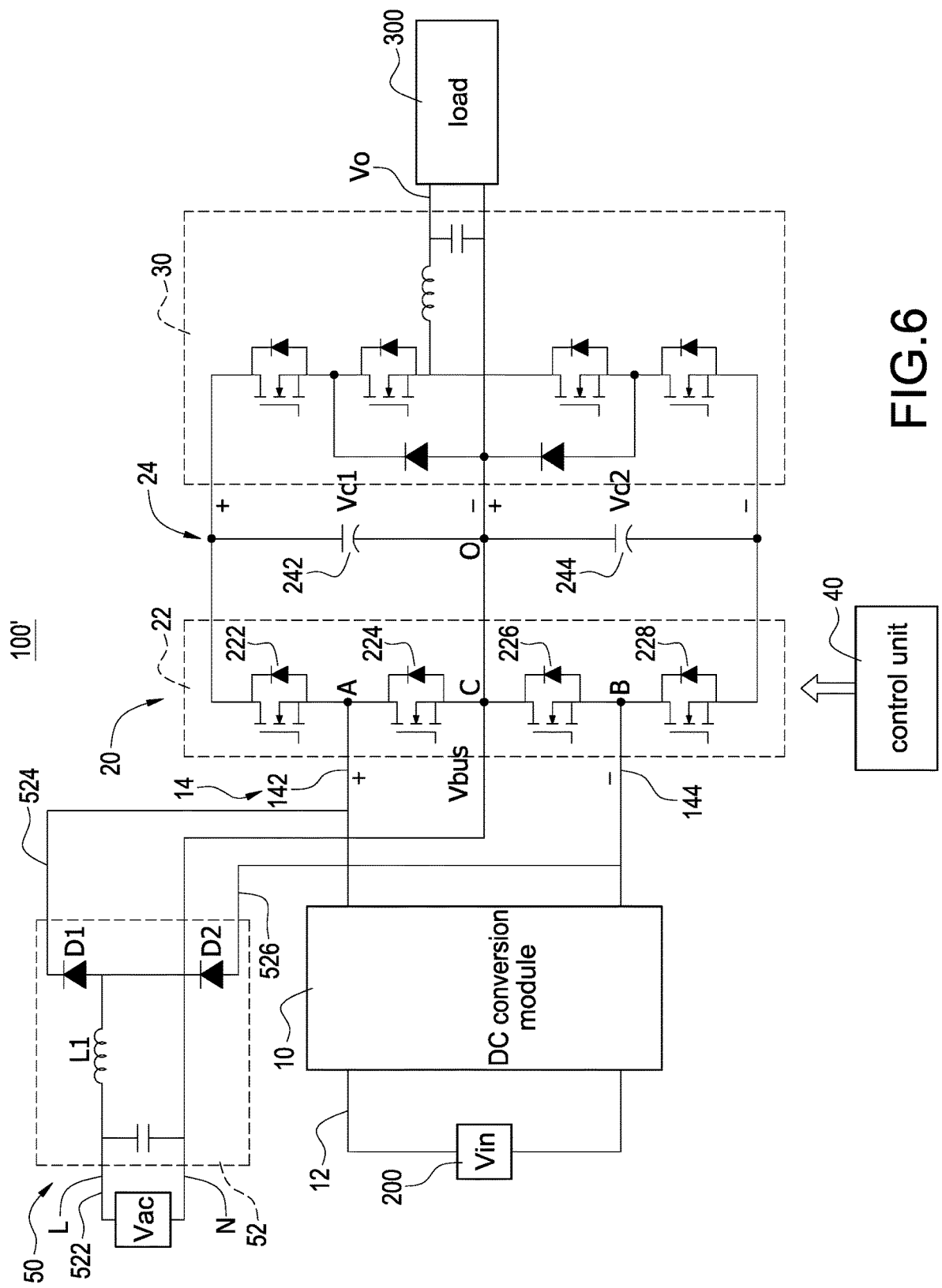
FIG. 6 is a block circuit diagram of the conversion apparatus with the three-level switching circuit according to a second embodiment of the present disclosure.

Please refer to FIG. 6, which shows a block circuit diagram of the conversion apparatus with the three-level switching circuit according to a second embodiment of the present disclosure, and also refer to FIG. 2 to FIG. 4B. For an uninterruptible power system (UPS) application, a power factor correction circuit having AC input ends and DC output ends can be used. The AC input ends receive an AC voltage Vac and the DC output ends are coupled to the capacitor assembly 24 shown in FIG. 2 to FIG. 5B. In one embodiment, the three-level circuit 20 can be commonly used for saving device cost and volume, further details below. The difference between the conversion apparatus 100' and the conversion apparatus 100 shown in FIG. 2 is that the conversion apparatus 100' further includes a power factor correction circuit 50. The power factor correction circuit 50 includes a power circuit 52 and the three-level circuit 20. The power factor correction circuit 50 receives the AC voltage Vac and converts the AC voltage Vac into the first capacitor voltage Vc1 and the second capacitor voltage Vc2. The power circuit 52 includes AC input ends 522, a first rectifying end 524, and a second rectifying end 526. The AC input ends 522 has a live wire end L and a neutral wire end N. The power circuit 52 receives the AC voltage Vac through the live wire end L and the neutral wire end N. The neutral wire end N is coupled to the third node C of the three-level circuit 20, the first rectifying end 524 is coupled to the first node A of the three-level circuit 20, and the second rectifying end 526 is coupled to the second node B of the three-level circuit 20.

The power circuit 52 includes a power inductor L1, a first diode D1, and a second diode D2. A first end of the power inductor L1 is coupled to the live wire end L, and a second end of the power inductor L1 is coupled to an anode of the first diode D1 and a cathode of the second diode D2. A cathode of the first diode D1 (i.e., the first rectifying end 524) is coupled to the first node A, and an anode of the second diode D2 (i.e., the second rectifying end 526) is coupled to the second node B. When the conversion apparatus 100' includes the power factor correction circuit 50 and has the function of AC-to-DC conversion, the control unit 40 can selectively control the bridge arm assembly 22 to be operated in the DC mode or the AC mode. In the DC mode, the DC conversion module 10 charges the first capacitor voltage Vc1 or the second capacitor voltage Vc2 by switching the three-level circuit 20. In the AC mode, no output is provided from the DC conversion module 10, and the AC voltage Vac is converted into the first capacitor voltage Vc1 and the second capacitor voltage Vc2 by switching the power circuit 52 and the three-level circuit 20. Since the three-level circuit 20 is regarded as a part of the power factor correction circuit 50, the bridge arm assembly 22 and the capacitor assembly 24 are commonly used in the DC mode and the AC mode.

One step-up converter is composed of the power inductor L1, the first switch unit 222, and the second switch unit 224, and another step-up converter is composed of the power inductor L1, the third switch unit 226, and the fourth switch unit 228. The AC voltage Vac in the positive half cycle and the AC voltage Vac in the negative half cycle are converted into the first capacitor voltage Vc1 and the second capacitor voltage Vc2 by switching the two step-up converters, respectively. In the positive half cycle of the AC mode, the control unit 40 switches the first switch unit 222 and the second switch unit 224 to converter the AC voltage Vac into the first capacitor voltage Vc1. When the second switch unit 224 is turned on, a current patch (i.e., an energy-storing path of the power inductor L1) is formed through the live wire end L, the power inductor L1, the first diode D1, the second switch unit 224, and the neutral wire end N. When the first switch unit 222 is turned on, a current path (i.e., an energy-releasing path of the power inductor L1) is formed through the live wire end L, the power inductor L1, the first diode D1, the first switch unit 222, the first capacitor 242, and the neutral wire end N.

In the negative half cycle of the AC mode, the control unit 40 switches the third switch unit 226 and the fourth switch unit 228 to converter the AC voltage Vac into the second capacitor voltage Vc2. Its path is similar to that during the positive half cycle, and the detail description is omitted here for conciseness. Please refer to FIG. 4A and FIG. 4B, the first switch unit 222 and the fourth switch unit 228 can also be actively controlled transistors or passive diodes. In the positive half cycle of the AC voltage Vac, the control unit 40 can only control the second switch unit 224, and make the passive first switch unit 222 forward bias or reverse bias (similar for the negative half cycle). Alternatively, in the positive half cycle of the AC voltage Vac, the control unit 40 can control complementarily switching of the first switch unit 222 and the second switch unit 224 (similar for the negative half cycle). In the AC mode, since the AC voltage Vac is converted into the first capacitor voltage Vc1 and the second capacitor voltage Vc2 by storing energy and releasing energy of the power inductor L1, the switching frequency of controlling the first switch unit 222, the second switch unit 224, the third switch unit 226, and the fourth switch unit 228 by the control unit 40 is high switching frequency, for example but not limited to 50 kHz, that is, the switching frequency is higher than the switching frequency (for example but not limited to the mains frequency) in the operation of the DC mode. In the AC mode, the specific control method of the first switch unit 222, the second switch unit 224, the third switch unit 226, and the fourth switch unit 228 can use any power factor correction control manner well known to those skilled in the art. This embodiment is mainly used to illustrate the way of commonly using the bridge arm assembly 22.

Since the power circuit 52 and the three-level circuit 20 are composed of the power factor correction circuit 50, that is, the three-level circuit 20 of the conversion apparatus 100' is commonly used, the conversion apparatus 100' of the present disclosure can further reduce the number of components, save the cost of circuit components, and increase the circuit power density in comparison with the traditional uninterruptible power system.

Figure 7:
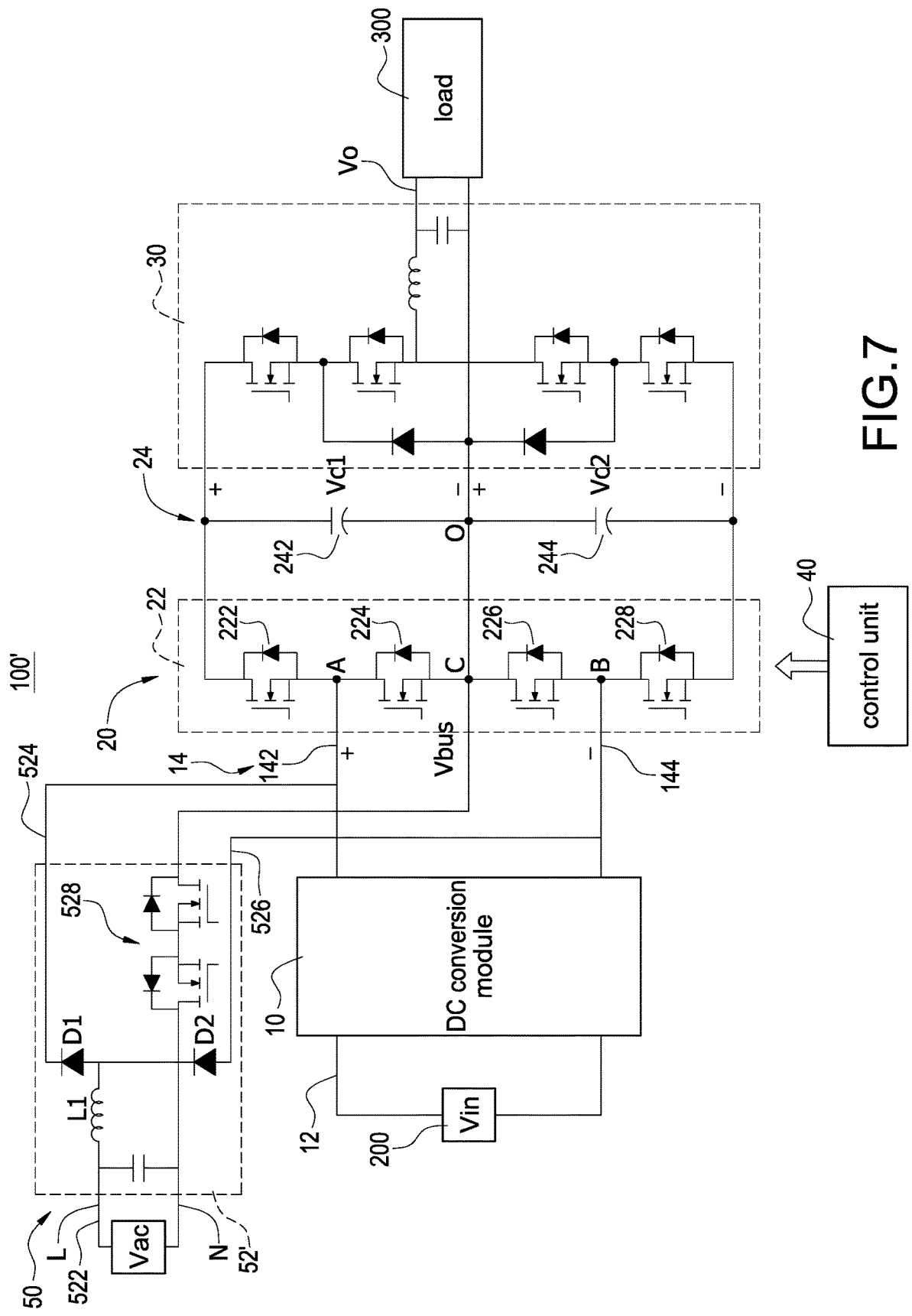
FIG. 7 is a block circuit diagram of a power circuit according to the present disclosure.

Please refer to FIG. 7, which shows a block circuit diagram of a power circuit according to the present disclosure, and also refer to FIG. 2 to FIG. 5B. The difference between the power circuit 52' and the power circuit 52 shown in FIG. 6 is that the power circuit 52 further includes a bidirectional switch 528. The bidirectional switch 528 is used to bidirectionally turn on and turn off the circuits between the neutral wire end N and a third node C, that is, the circuits between the neutral wire end N and a third node C can be completely disconnected when the bidirectional switch 528 is turned off. Specifically, since the current may be delivered from the third node C to the neutral wire end N or from the neutral wire end N to the third node C in the DC mode, the three-level circuit 20 can be stabilized by bidirectionally turning on and turning off the circuits between the neutral wire end N and the third node C through the bidirectional switch 528. In one embodiment, the power circuit 52 is not limited to only being implemented with the circuit structure of FIG. 6 and FIG. 7, that is, any circuit that can be used with the three-level circuit 20 for the AC-to-DC conversion operation should be embraced within the scope of the present disclosure.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A conversion apparatus with a three-level switching circuit, comprising:
    a DC conversion module having a DC input end and an output end, the DC input end configured to receive an input voltage, and the output end having a positive output end and a negative output end,
    a three-level circuit, comprising:
        a bridge arm assembly having a first switch unit, a second switch unit, a third switch unit, and a fourth switch unit connected in series; a first node between the first switch unit and the second switch unit coupled to the positive output end, and a second node between the third switch unit and the fourth switch unit coupled to the negative output end, and
        a capacitor assembly having a first capacitor and a second capacitor connected in series; a positive end of the first capacitor coupled to the first switch unit and a negative end of the second capacitor coupled to the fourth switch unit, and a middle end between the first capacitor and the second capacitor coupled to a third node between the second switch unit and the third switch unit, and
        a control unit configured to control the bridge arm assembly to operate in a DC mode,
        wherein in the DC mode, the control unit is configured to switch the second switch unit and the third switch unit so that the three-level circuit operates in a first state of connecting the first capacitor to the positive output end and the negative output end, and operates in a second state of connecting the second capacitor to the positive output end and the negative output end,
        wherein in the first state, the control unit turns on the third switch unit so that the DC conversion module charges the first capacitor to maintain a first capacitor voltage across the first capacitor to a bus voltage; in the second state, the control unit turns on the second switch unit so that the DC conversion module charges the second capacitor to maintain a second capacitor voltage across the second capacitor to the bus voltage, and
        wherein when the bridge arm assembly operates in the DC mode, the control unit switches a switching frequency of the second switch unit and the third switch unit to be a first frequency, and the first frequency is less than or equal to 1 kHz, and
        wherein when the bridge arm assembly operates in the DC mode, the control unit switches a switching frequency of the DC conversion module to be a second frequency which is higher than the first frequency.

2. The conversion apparatus as claimed in claim 1, wherein the DC conversion module is a switched-mode power supply having at least one switching switch.

3. The conversion apparatus as claimed in claim 2, wherein when the bridge arm assembly operates in the DC mode, the control unit switches the second switch unit and the third switch unit in the first frequency, and the control unit switches the at least one switching switch in the second frequency which is higher than the first frequency.

4. The conversion apparatus as claimed in claim 1, further comprising:
    a power factor correction circuit having an AC input end and a DC output end, wherein the AC input end receives an AC voltage and the DC output end is coupled to the capacitor assembly.

5. The conversion apparatus as claimed in claim 4, wherein the power factor correction circuit comprises:
    the three-level circuit, and
    a power circuit having the AC input end, a first rectifying end, and a second rectifying end, wherein the AC input end receives the AC voltage and is coupled to the third node, the first rectifying end is coupled to the first node, and the second rectifying end is coupled to the second node.

6. The conversion apparatus as claimed in claim 5, wherein the power circuit comprises:
    a power inductor coupled to the AC input end,
    a first diode coupled to the power inductor and the first node, and
    a second diode coupled to the power inductor and the second node,
    wherein the AC input end has a live wire end and a neutral wire end, and the live wire end is coupled to the power inductor and the neutral wire end is coupled to the third node.

7. The conversion apparatus as claimed in claim 5, wherein when the bridge arm assembly operates in an AC mode, a positive half cycle of the AC voltage is converted into the first capacitor voltage across the first capacitor by switching the second switch unit, and a negative half cycle of the AC voltage is converted into the second capacitor voltage across the second capacitor by switching the third switch unit.

8. The conversion apparatus as claimed in claim 7, wherein, when the bridge arm assembly operates in the AC mode, the control unit controls the switching frequency of the second switch unit and the third switch unit to be higher than the first frequency.

9. The conversion apparatus as claimed in claim 8, wherein the first frequency is a mains frequency.

10. The conversion apparatus as claimed in claim 1, wherein the first switch unit and the fourth switch unit are diodes.

11. The conversion apparatus as claimed in claim 1, wherein the first switch unit and the fourth switch unit are transistors, and the control unit is coupled to the first switch unit and the fourth switch unit; when the control unit turns on the second switch unit, the control unit turns off the first switch unit, and when the control unit turns on the third switch unit, the control unit turns off the fourth switch unit.

12. A method of operating a three-level switching circuit, the three-level switching circuit comprising a bridge arm assembly having a first switch unit, a second switch unit, a third switch unit, and a fourth switch unit connected in series; a first node between the first switch unit and the second switch unit coupled to a positive output end of a DC conversion module, and a second node between the third switch unit and the fourth switch unit coupled to a negative output end of the DC conversion module, the method comprising steps of:

controlling the bridge arm assembly operating in a DC mode, turning on the third switch unit in a first cycle of the DC mode so that the DC conversion module charges a first capacitor through the positive output end and the negative output end to maintain a first capacitor voltage across the first capacitor to be a bus voltage, and turning on the second switch unit in a second cycle following the first cycle so that the DC conversion module charges a second capacitor connected to the first capacitor in series through the positive output end and the negative output end to maintain a second capacitor voltage across the second capacitor to be the bus voltage, and when the bridge arm assembly operates in the DC mode, switching a switching frequency of the second switch unit and the third switch unit to be a first frequency, wherein the first frequency is less than or equal to 1 kHz, and switching a switching frequency of the DC conversion module to be a second frequency which is higher than the first frequency.

13. The method of operating the three-level switching circuit as claimed in claim 12, further steps of:

controlling the bridge arm assembly operating in an AC mode, converting a positive half cycle of an AC voltage into the first capacitor voltage by switching the second switch unit in the AC mode, and converting a negative half cycle of the AC voltage into the second capacitor voltage by switching the third switch unit in the AC mode.

14. The method of operating the three-level switching circuit as claimed in claim 13, wherein the switching frequency of the second switch unit and the third switch unit is a mains frequency in the DC mode, and the switching frequency is higher than the mains frequency in the AC mode.

15. The method of operating the three-level switching circuit as claimed in claim 12, wherein when the second switch unit is turned on, the first switch unit is turned off, and when the third switch unit is turned on, the fourth switch unit is turned off.

* * * * *